United States Patent [19]

McCracken et al.

[11] Patent Number: 4,568,933
[45] Date of Patent: Feb. 4, 1986

[54] ELECTRONIC WELL TOOLS AND MULTI-CHANNEL RECORDER

[75] Inventors: Oliver W. McCracken, Pauls Valley, Okla.; Donald F. Taylor, Dallas, Tex.; Carlos E. Montgomery, Anchorage, Ak.; Larry C. Wortham, Garland, Tex.

[73] Assignee: Otis Engineering Corporation, Dallas, Tex.

[21] Appl. No.: 307,285

[22] Filed: Oct. 9, 1981

[51] Int. Cl.⁴ .......................... G01U 1/40; G01D 5/12
[52] U.S. Cl. ...................................... 340/856; 73/155; 340/870.12; 340/870.26
[58] Field of Search ........... 340/853, 855, 857, 870.26, 340/860, 870.12, 870.39; 73/151, 155; 346/33 TP; 367/32, 49, 76, 78, 80; 166/65 M, 250

[56] References Cited

U.S. PATENT DOCUMENTS

| | | | |
|---|---|---|---|
| 3,036,460 | 5/1962 | White et al. | 73/155 |
| 3,122,707 | 2/1964 | Godbey | 367/80 |
| 3,561,832 | 2/1971 | Karrer et al. | 310/338 |
| 3,727,179 | 4/1973 | Bennett | 340/860 |
| 3,883,797 | 5/1975 | Abrukin | 166/65 M |
| 3,911,743 | 10/1975 | Nicolas et al. | 73/155 |
| 3,980,881 | 9/1976 | Veach et al. | 250/261 |
| 3,988,712 | 10/1976 | Ezell et al. | 367/80 |
| 4,107,697 | 8/1978 | McCracken | 346/33 R |
| 4,161,782 | 7/1979 | McCracken | 364/571 |
| 4,198,621 | 4/1981 | Roper | 340/870.24 |
| 4,267,727 | 5/1981 | Hoppe | 73/151 |
| 4,275,786 | 6/1981 | Lee | 166/65 R |
| 4,296,413 | 10/1981 | Milkovic | 340/870.26 |
| 4,417,470 | 11/1983 | McCracken et al. | 73/154 |

FOREIGN PATENT DOCUMENTS

| | | |
|---|---|---|
| 1341830 | 12/1973 | United Kingdom . |
| 1507229 | 4/1978 | United Kingdom . |
| 1589546 | 5/1981 | United Kingdom . |

*Primary Examiner*—T. H. Tubbesing
*Assistant Examiner*—K. R. Kaiser
*Attorney, Agent, or Firm*—Thomas R. Felger

[57] ABSTRACT

An electronic recording device and multiple sensors for measuring various parameters at locations remote from the recording device. The multiple sensors can be joined together to comprise a downhole tool for measuring various parameters within a well bore and transmitting information concerning each parameter to the recording device via a single conductor electrical wireline. The embodiment disclosed within this patent measures the parameters of pressure, temperature, flow rate plus direction, and collar location. A wide variety of sensors can be included within the downhole tool to measure additional parameters as desired. This invention allows the multiple sensors to measure various parameters at any location remote from the recording device and to transmit information concerning each parameter to the recording device on single conductor electrical line as a composite signal.

22 Claims, 13 Drawing Figures

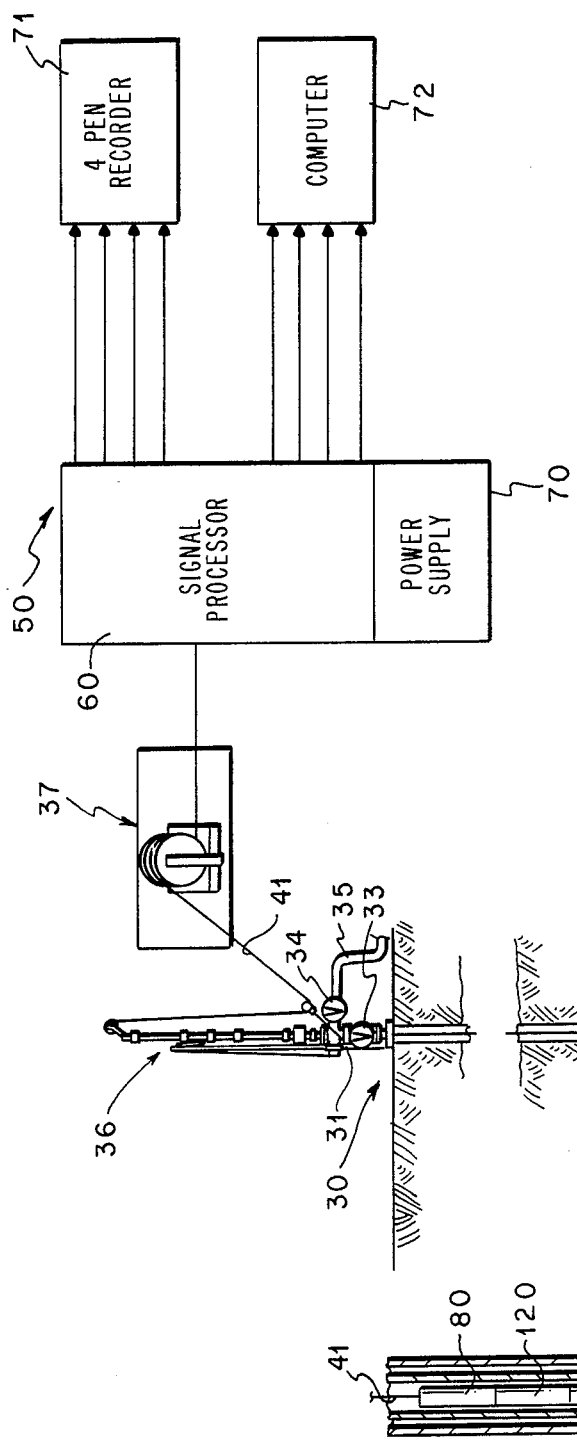

ELECTRONIC WELL TOOLS AND MULTI-CHANNEL RECORDER

BACKGROUND OF THE INVENTION

1. Field of the Invention

This invention relates generally to electronic recording devices and multiple sensors for measuring various parameters at locations remote from the recording device. The present invention is particularly adapted for using multiple sensors to measure various parameters at a downhole location within the bore of an oil or gas well and to record each parameter at the well surface. However, the invention can be used to measure various parameters at the well surface or to measure parameters in other types of wells.

2. Description of the Prior Art

For many years, operators of oil and gas wells have been interested in measuring various physical parameters associated with each well in order to understand the characteristics of the underground hydrocarbon producing formation and to optimize the production of hydrocarbons from each well. Some of the more frequently measured parameters are:

a. bottom hole pressure and surface pressure when the well is both flowing and shut in;
b. flow rate versus pressure and direction of fluid flow;
c. pressure versus time both during pressure buildup after shutting in a well and pressure drawdown after resuming flow;
d. oil versus gas ratio in the production fluid; and
e. the depth at which each parameter is measured.

U.S. Pat. No. 4,107,697 titled Pressure Recorder with Power Conservation Means and U.S. Pat. No. 4,161,782 titled Microprocessor Computerized Pressure/Temperature/Time Down-Hole Recorder disclose well tools which can measure and record some of these parameters. Both patents are incorporated by reference for all purposes within this application.

SUMMARY OF THE INVENTION

The present invention discloses methods and apparatus for measuring and transmitting information from multiple remote sensors through a single conductor electrical line to a central location comprising the steps of transmitting electrical energy from a power source at the central location to the sensors via the electrical line; each sensor converting the electrical energy to a signal within a discrete frequency range assigned to that sensor; transmitting the combined signal from all of the sensors to the central location via the electrical line; filtering the discrete frequency signals from the combined signal on the electrical line at the central location to produce one discrete signal for each sensor; and processing each discrete signal to obtain a readout of the information transmitted from the respective sensor.

One object of the present invention is to provide a recording means and a tool with multiple sensors that can be electrically connected by a common single conductor electrical line and simultaneously transmit information about the parameter measured by each sensor to the recording means.

Another object of the present invention is to provide a recorder which can discriminate between and record separately electrical signals from a plurality of remote sensors transmitted to the recorder on a single conductor electrical line.

A further object of the present invention is to measure within a well bore, using a well tool having multiple sensors, the downhole parameters of pressure, temperature, flow rate and collar location.

These and other objects and advantages of the present invention will become apparent to those skilled in the art from the following drawings, written description, and claims.

BRIEF DESCRIPTION OF THE DRAWINGS

FIG. 1 is a schematic drawing, partially in section and elevation, showing the present invention as used with respect to an oil and gas well. The recording means located at the well surface is shown in block diagram form.

FIG. 2 is a schematic drawing of a downhole tool incorporating the present invention located within a well bore.

DESCRIPTION OF THE PREFERRED EMBODIMENTS

Figure 3A:
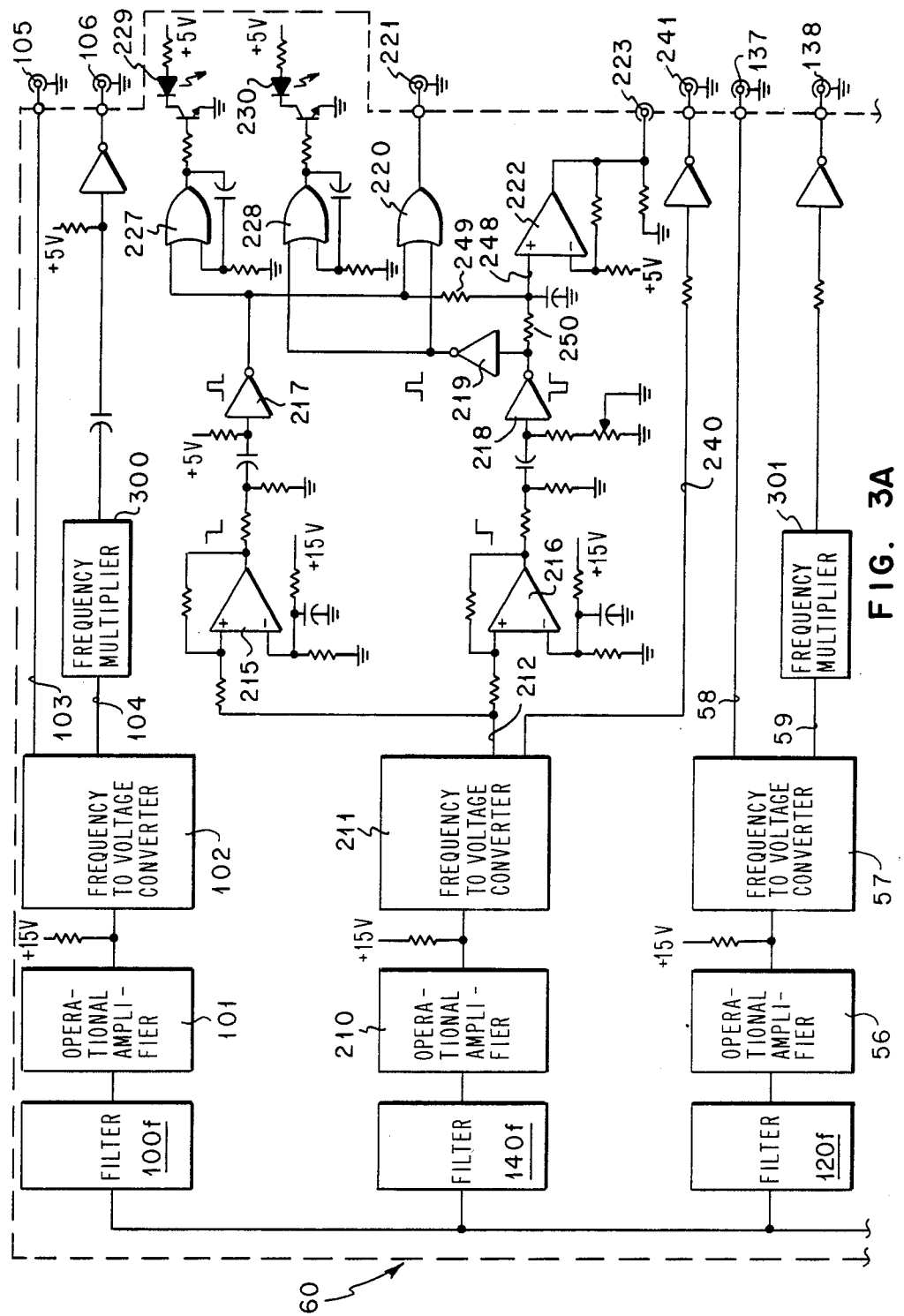
FIGS. 3A and 3B are schematic drawings showing portions of the electrical circuits of the recording means and power supply used in the present invention.

This description is made with respect to using the invention to measure various parameters at a downhole location within an oil and gas well. However, this invention can be used in any type of well. Also, this invention can be used to measure multiple parameters at any location either downhole or at the well surface. An important feature of the present invention is that a plurality of sensors can be remotely located from a central location and each sensor send information to a recorder at the central location on a common single conductor electrical line.

FIG. 1 shows a typical well installation for using the present invention. Well 30 includes wellhead equipment 31 at the well surface and casing 32 extending from wellhead 31 to the underground producing formation. Mastr valve 33 and wing valve 34 are used to control the production of fluids from well 30 into surface flow line 35.

A standard wireline lubricator and associated equipment 36 are shown attached to the top of wellhead 31. Standard wireline techniques are used to install within and remove downhole tool 40 from the well bore defined by casing 32. Downhole tool 40 is attached to a standard single conductor electrical line 41 with wireline winch 37 used to raise and lower tool 40. Single conductor electrical line 41 is electrically connected to recording means 50 which includes signal processor 60, power supply 70, four pen recorder or strip chart 71, and a conventional digital computer 72. Various analog strip chart recorders are commercially available for use as four pen recorder 71. The specific strip chart recorder used with the present invention depends upon the number of parameters being measured. For example, if four sensors are used to measure four different parameters, strip chart 71 should have at least four pens for recording each parameter individually.

A frequent test which is conducted on producing oil and gas wells is to shut in the well by closing wing valve 34 and measuring the buildup of downhole pressure versus time. A plot of pressure versus time can provide valuable information concerning the physical characteristics of the underground hydrocarbon reservoir. The accuracy of the pressure information in greatly increased by simultaneously measuring the temperature of the fluid surrounding downhole tool 40. The present invention allows the parameters of pressure and temperature to by simultaneously measured downhole, transmitted to the well surface on a single conductor electrical line, and recorded on both analog strip chart 71 and digital computer 72.

In addition to measuring pressure and temperature, other parameters of interest are the location of tool 40 and the volume and direction of any fluid flow past tool 40. A variety of flow meters is available to sense fluid movement. Location can be accurately determined by sensing each collar (not shown) in the tubing or casing string as tool 40 is lowered and recording the total number of collars. In both FIGS. 1 and 2, tool 40 is shown as having four separate sensors. The present invention allows the number and type of sensors carried by tool 40 to be easily increased or decreased depending upon the number of parameters desired to be measured and recorded. In addition to the following sensors discussed in detail, the present invention will allow a liquid level sensor, a fluid phase sensor or a bottom hole sampler to be easily incorporated into tool 40. In the past, it has been the general practice to run each sensor separately to obtain a continuous readout at the well surface of information measured by the sensor or to use a downhole recording device with limited storage capacity while measuring more than one parameter.

FIG. 2 is a schematic representation of an alternative well completion which can utilize the present invention. Production tubing string 38 is disposed within the bore of casing string 32. Downhole tool 40 is shown suspended from electric line 41 within the bore of tubing 38. The preferable sequence for attaching the sensors to wireline 41 is first collar locator 80, then either pressure sensor 100 or temperature sensor 120, and last flow meter or spinner 140. Collar locator 80 is attached to wireline 41 first to provide an easy reference for the downhole location of the other sensors within tool 40. Flow meter or spinner 140 should preferably be the bottom sensor when tool 40 is suspended within a well bore so that the other sensors within tool 40 do not block or restrict fluid flow past spinner 140.

Power supply 70 provides direct current (DC) voltage which is transmitted through wireline 41 to tool 40 and is also supplied to the various components of signal processor 60. Each sensor within tool 40 is assigned a discrete frequency band or range for use in transmitting information over the same, common line such as wireline 41. A typical assignment of frequencies for tool 40 is 40-60 hertz for collar locator 80, 200-400 hertz for temperature sensor 120, 1500 to 2100 hertz for spinner 140, and 8,000 to 25,000 hertz for pressure sensor 100. These signals can be transmitted simultaneously as a composite or combined signal and allow for real time analysis of the various parameters being measured at the remote location. Signal processor 60 discriminates between and selectively sorts out the frequency signal from each sensor. Recording means 50 has the capability of decode, display, and prepare for input to a digital computer the signal from each remote sensor.

Single conductor line 41 is connected electrically to signal processor 60 via terminal 74. A grounded connection 74g is shown adjacent to terminal 74. The typical, standard electrical line which can be used as single conductor line 41 consists of an electrically conductive wire (copper) surrounded by insulating material. The outer layers of the insulating material are reinforced by additional wires (steel) and/or wrapped by reinforcing wire mesh. This outer protective layer of line 41 is grounded and electrically attached to connector 74g. The electrical flow path is from terminal 74 through the center wire within line 41 to tool 40 and its electrical components. The return flow path is via ground which includes the outer protective layer of line 41. The term "single conductor" refers to the center wire within line 41.

Power Supply

Power supply 70 transmits electrical energy to wireline 41 through terminal 74 via current regulating network 73. Preferably, the value of DC voltage at terminal 74 remains relatively constant. Each sensor which can be attached to tool 40 requires a predetermined amount of electrical energy to function satisfactorily. Therefore, current switches 80a, 100a, 120a, and 140a are included within network 73. When each switch is closed, it causes the required amount of electrical energy to operate its corresponding sensor to flow from power supply 70 to terminal 74. For purposes of this written description, switch 80a corresponds to collar locator 80, switch 100a corresponds to pressure sensor 100, switch 120a corresponds to temperature sensor 120, and switch 140a corresponds to flow meter 140. If a particular sensor is removed from tool 40, its corresponding switch should be opened within network 73. The present invention allows for a large combination of sensors to be attached to or removed from tool 40. Also, the number of switches that can be placed within network 73 is limited only by the capacity of power supply 70 and the current carrying limits of line 41.

The characteristics of PNP transistor 75 and diodes 76 and 77 are selected such that closing the switches within network 73 changes the bias on transistor 75 and allows current flow from power supply 70 to terminal 74. For the downhole sensors discussed in this written description, closing either switch 80a or 120a produces an additional current flow of seven milliamps which corresponds to the current required by collar locator 80 or temperature sensor 120. Closing either switch 100a or 140a produces an additional current flow of fourteen milliamps which corresponds to the current required by pressure sensor 100 or flow meter 140. The electrical characteristics of the transistors, diodes, and resistors included within network 73 can be varied to correspond to the requirements of the sensors used in tool 40.

For the electrical circuits shown within this embodiment of the present invention, power supply 70 is selected to produce regulated voltage outputs of +15 volts DC, +5 volts DC, −5 volts DC, and +7.5 volts AC. Again, these value can be varied to correspond to the electrical requirement of the sensors in tool 40 and signal processor 60.

Signal Processor and Recording Means

Signal processor 60 contains four separate electrical signal processing circuits which correspond respectively to one of the sensors in tool 40. Each processing circuit is connected in parallel electrically with respect to the composite signal at terminal 74 from wireline 41. The first component of each processing circuit is a filter which is tuned to accept the frequency band of the sensor assigned to the processing circuit. Various electrical components within each processing circuit are functionally identical and are shown as blocks within FIG. 3A. Filter 100f is the first component in the processing circuit for the signal from pressure sensor 100. Filter 140f is the first component in the processing circuit for the signal from flow meter 140. Filter 120f is the first component in the processing circuit for the signal from temperature sensor 120. Filter 80f is the first component in the processing circuit for the signal from collar locator 80. Unique components for each of these processing circuits will be discussed later.

Figure 3B:
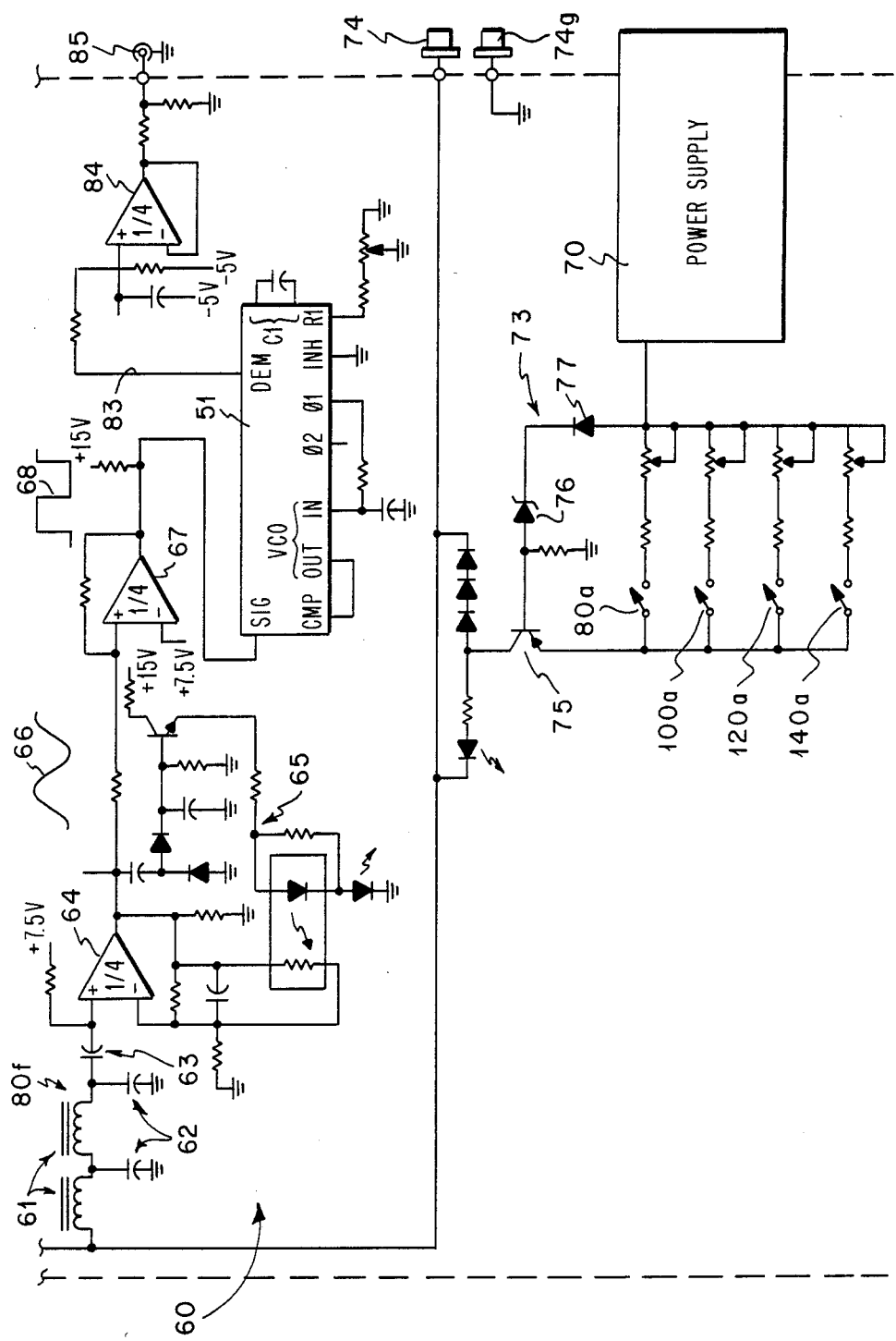

In FIG. 3B, the electrical schematic for the circuit which processes the signal from collar locator 80 is shown in more detail. The electrical schematic for the items shown as blocks in FIG. 3A are similar to the collar locator processing circuit but have values of resistance, inductance, and capacitance appropriate for each individual signal.

Filter 80f comprises a series of inductors 61 and capacitors 62 with the appropriate electrical characteristics to allow an alternating current within the frequency range of 40 to 60 hertz to flow through the remainder of the processing circuit. Capacitor 63 blocks DC current from entering the remainder of the processing circuit. Amplifier 64 accepts an AC signal from filter 80f having a relatively low voltage and increases the voltage by approximately a factor of fifty. Biasing circuit 65 consists of the required resistors, capacitors, and diodes to satisfactorily operate amplifier 64. The output from amplifier 64 is approximately a sine wave as represented by waveform 66. Fluctuations of the signal from collar locator 80 between 40 and 60 hertz produce waveform 66. When the signal from collar locator 80 is a constant 50 hertz, the output from amplifier 64 is flat. Comparator 67 converts waveform 66 into essentially square wave 68. Device LM 339 is satisfactory for use as comparator 67. Thus, amplifier 64 and comparator 67 plus biasing circuit 65 combine to act as an operational amplifier and produce an essentially digital output shown as square wave 68.

The output from comparator 67 is next directed through frequency to voltage converter or demodulator 51. Frequency to voltage converter 51 is preferably a commercially available 4046 device sometimes referred to as a phase locked loop. A device 4046 has a wide variety of possible inputs and outputs. In the processing circuit for the signal from collar locator 80, device 4046 functions as a frequency to DC voltage converter or demodulator. The square wave input to converter 51 is transformed into a DC voltage output on line 83. This DC voltage represents an analog signal corresponding to the magnetic coupling sensed by locator 80 downhole. The DC voltage is directed through current amplifier/buffer 84 to contact 85. Various strip charts such as four pen recorder 71 can be electrically attached to contact 85 to provide a permanent record of collars sensed by tool 40.

The particular signal processing circuit shown in FIG. 3B uses only an analog output from device 4046. The other signal processing circuits shown in FIG. 3A produce a digital output in addition to the analog signal.

Collar Locator and Characteristics Common to each Sensor

Figure 6:
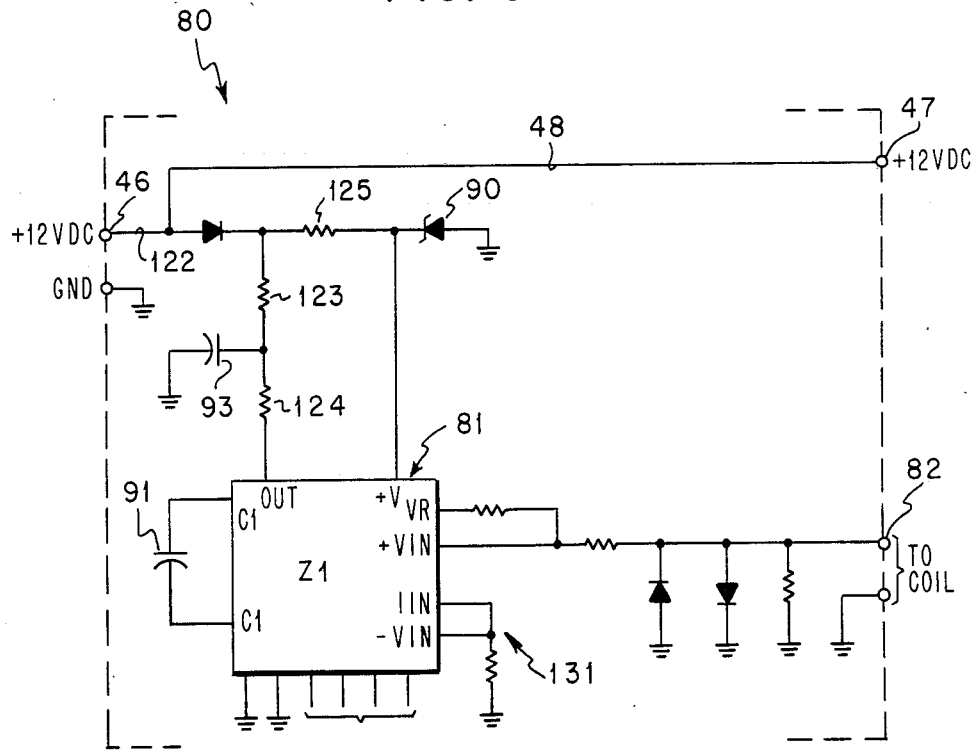
FIG. 6 is a schematic drawing showing portions of the electrical circuit of the collar locator sensor which is contained within the downhole tool of FIG. 2.

FIG. 6 shows the electrical circuit for collar locator sensor 80 which can be used with tool 40. A critical component required by all remote sensors used with the present invention is a DC voltage to frequency converter. The electrical symbol assigned to this component is Z1. DC voltage to frequency converters satisfactory for use in the electrical circuits of the sensors of tool 40 have the commercial designation of AD537JD.

Converter 81 transforms DC voltage received from resistor 125 into an AC signal which is transmitted via resistors 123 and 124 to terminal 46. An electrical coil (not shown) supplies a low frequency AC input at contact 82 to converter 81 to vary the frequency of its output. The frequency of this AC input is a function of the rate of travel of sensor 80 within the tubing/casing. Generally, this AC input from contact 82 is less than 20 hertz with 3 to 5 hertz being typical.

Permanent magnets (not shown) are positioned within locator 80 adjacent to the coil. The voltage present at contact 82 is a function of the magnetic coupling between the permanent magnets and the coil. The magnetic coupling is in turn a function of the thickness of the metal tubing and/or casing surrounding tool 40. When collar locator 80 moves through metal tubing having a uniform thickness, little or no voltage is generated at contact 82. Converter 81 produces a constant 50 hertz output with zero AC voltage input from contact 82. When collar locator 80 passes a discontinuity within tubing 38 such as the increased metal thickness of a collar, the magnetic coupling with the coil changes causing an AC voltage to be generated at contact 82.

Converter 81 is preferably tuned so that an increase in input voltage causes an increase in frequency output to approximately 55 hertz. As collar locator 80 moves away from the collar, voltage across the coil will decrease causing the output frequency of converter 81 to decrease to approximately 45 hertz. When locator 80 returns to a portion of tubing 38 having uniform wall thickness, the voltage generated by the coil will be essentially zero, and the output from converter 81 will return to an approximately constant 50 hertz.

Figure 4:
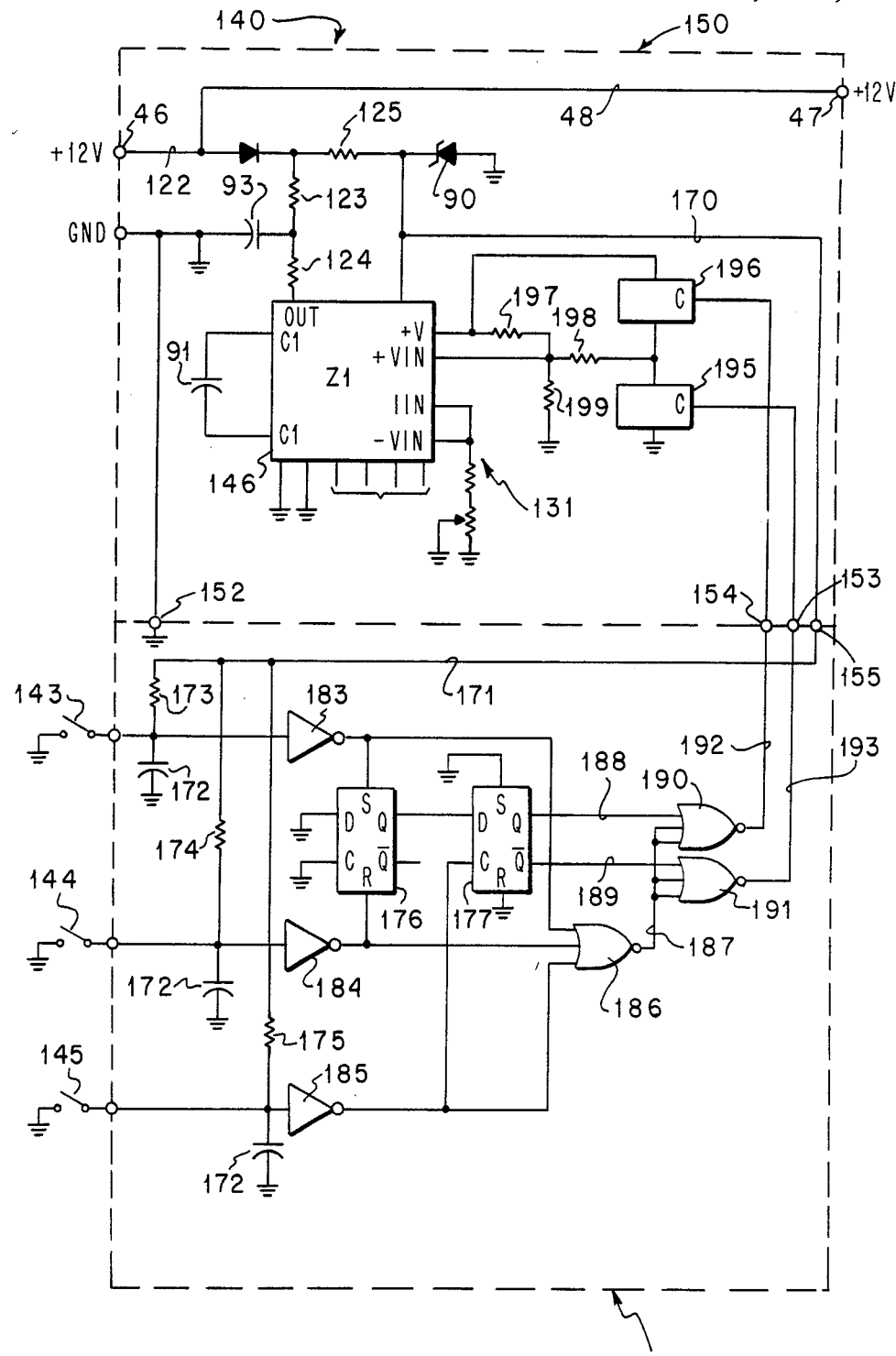
FIG. 4 is a schematic drawing showing portions of the electrical circuit of the flow rate sensor which is contained within the downhole tool of FIG. 2.
Figure 5:
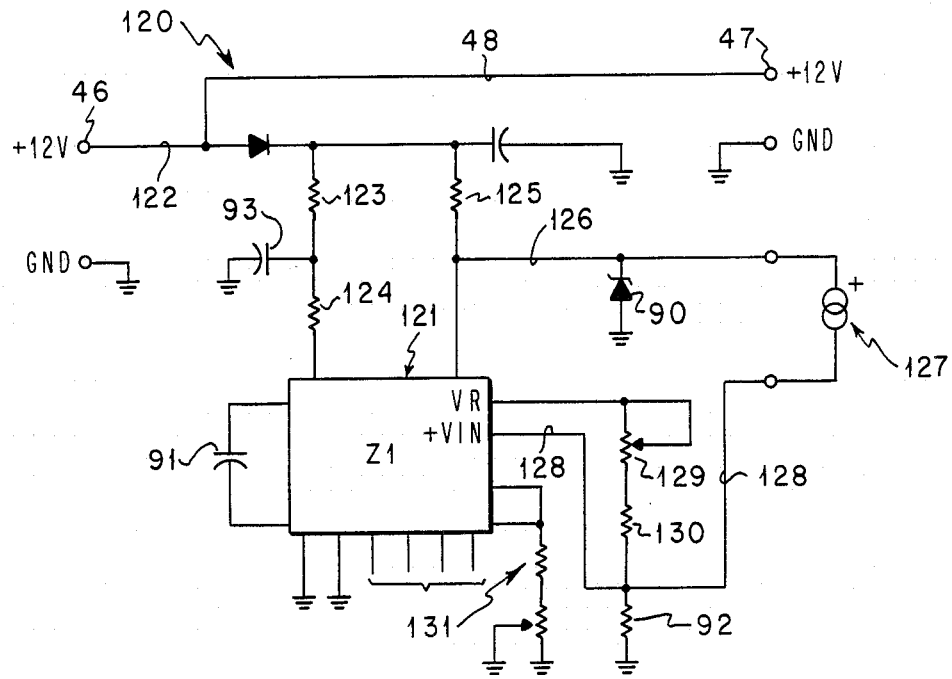
FIG. 5 is a schematic drawing showing portions of the electrical circuit of the temperature sensor which is contained within the downhole tool of FIG. 2.

The electrical circuit for collar locator 80 has several characteristics in common with the electrical circuits for temperature sensor 120 shown in FIG. 5 and flow sensor 140 shown in FIG. 4. Each circuit has a DC voltage to frequency converter Z1 which receives electrical power from terminal 46 via line 122. Electricity flows through various resistors, capacitors and diodes unique for each circuit to supply the desired voltage from line 122 to converter Z1 and the sensing element of each circuit. Resistor 125 and diode 90 are located within each sensor to function as a voltage regulating network between terminal 46 and the respective sensing element and converter for each sensor.

Diode 90 is included within the voltage regulating network to ensure that only DC voltage is directed to the respective sensing element. Diode 90 provides a direct path to ground for AC voltage. Diode 90 also limits the DC voltage supplied to the sensing element and/or converter Z1 to below a preselected value.

The output from each converter Z1 is returned to terminal 46 via resistors 123 and 124. Capacitor 93 is located between these two resistors to filter or remove undesired frequencies. Resistors 123 and 124 plus capacitor 93 partially define the output circuit for converter Z1.

A frequency regulating network 131 is also connected to each converter Z1 to control the AC signal output of each converter Z1 to within a preselected frequency range. Capacitor 91 is part of the frequency regulating network. Another common characteristic of the electrical circuit for the sensors used in the present invention is terminals 46 and 47. Terminal 46 of the first sensor in tool 40 receives DC current from power supply 70 via wireline 41. A portion of the DC current available from line 41 flows through the electrical circuit for that sensor and the remainder of the current is directed by line 48 to terminal 47. Terminal 46 for the next sensor within tool 40 can be electrically connected to terminal 47 of the preceding sensor. In this manner, the sensors are connected in parallel electrically with wireline 41. Each sensor removes its required amount of electrical energy from wireline 41 and transmits the remaining electrical energy to the following sensors. Due to the parallel electrical connections, failure of one sensor does not cause failure of the other sensors.

Temperature Sensor

A detailed description of temperature sensor 120 including its electrical and mechanical components is contained in copending patent application Ser. No. 307,284 filed on Sept. 30, 1981 now U.S. Pat. No. 4,417,470.

FIG. 5 shows the electrical circuit drawing for temperature sensor 120. Electrical power to operate sensor 120 is supplied by electric line 41 to terminal 46. The circuit in FIG. 5 is designed to operate with a 12 volt DC input. Various alternative electrical circuits and power supplies will be apparent to those skilled in the art to carry out the function of temperature sensor 120.

Line 122 supplies DC energy from terminal 46 to DC voltage to frequency converter 121 via appropriately sized resistor 125. Resistors 123 and 124 plus diode 90 function as part of the voltage regulating network supplying electrical power to converter 121. The electrical resistance value for resistors 123, 124, and 125 is varied as required by the circuits shown in FIGS. 4, 5, and 6.

Line 126 directs the DC energy available after flowing through resistor 125 to temperature sensing element 127. Analog Devices Inc. has a commercially available device number 590KF which can be used as element 127. Other devices satisfactory for use as sensing element 127 include a temperature sensitive resistor, a thermocouple, a thermistor, a silicon resistor, or a platinum resistor. The main requirement is that sensing element 127 change its current output in proportion to its temperature.

Line 128 directs DC current from element 127 back to summing resistor 92. The voltage drop across resistor 92 supplies an electrical input to vary the frequency output of converter 121. Resistors 129 and 130 provide a stable reference current for addition to the changing current from sensing element 127.

Frequency adjusting network 131 controls the output of converter 121 to within a preselected frequency range. For the electrical circuit shown in FIG. 5, frequency adjusting network 131 is selected to control the alternating current (AC) output from converter 121 to within the frequency range of 200 to 400 hertz. The output from converter 121 is directed back to terminal 46 through line 122 via resistors 123 and 124. A signal of 200 hertz at terminal 46 represents the lowest temperature that sensor 120 can report. A signal of 400 hertz at terminal 46 represents the highest temperature that sensor 120 can report. Sensing element 127 (AD590KF) is selected so that this frequency range corresponds to a temperature range of $-100°$ F. to $+500°$ F.

Line 48 directs electrical power from terminal 46 to terminal 47 bypassing the electrical components of temperature sensor 120. Preferably, terminal 46 is located at one end of the tool carrying sensor 120 and terminal 47 at the other. This configuration allows electrical line 41 to supply power to the electrical components of sensor 120 and to pressure sensor 100 attached to terminal 47.

Electrical Operating Sequence for Temperature Sensor

DC electrical energy flows from terminal 46 through line 122 and resistor 125 to operate converter 121. DC energy also flows from terminal 46 to temperature sensing element 127 via line 122, resistor 125, and line 126. The value of the DC current flow through element 127 changes in proportion to changes in the temperature of element 127. The voltage drop across summing resistor 92 provides the input to converter 121 to vary the output frequency of converter 121 in proportion to the temperature of element 127. The alternating current (AC) output (temperature signal) from converter 121 is directed via line 122 to terminal 46.

The signal from temperature sensor 120 is transmitted to terminal 74 via wireline 41. Filter 120*f* in signal processor 60 is tuned to accept the signals within the frequency range assigned to temperature sensor 120. Filter 120*f* is functionally the same as filter 80*f* except for having different values of inductance and capacitance. The output from filter 120*f* is an AC sine wave signal having a frequency corresponding to the temperature of the well fluids surrounding sensor 120. This signal is next directed to operational amplifier 56 which increases the strength of the signal and converts the sine wave signal to a square wave signal. Frequency to DC voltage converter 57, which contains a 4046 device (or phase locked loop), receives the signal from amplifier 56. The 4046 device within frequency converter 57 demodulates the signal and produces an analog output for temperature on line 58. In this respect, converter 57 functions the same as converter 51 in the signal processing circuit for collar locator 80. However, frequency converter 57 also sends a signal to frequency multiplier 301 which produces a digital output for temperature on line 59. The digital output is obtained by directing the signal from the 4046 device through a pair of decade counters shown as frequency multiplier 301 on line 59. A device 4017 is satisfactory for use as a decade counter within this circuit. Thus, an analog temperature signal is available at terminal 137 for use by strip chart 71 and a digital signal at terminal 138 for use by computer 72.

Flow Sensor

Figures 7A, 7B, 7C:
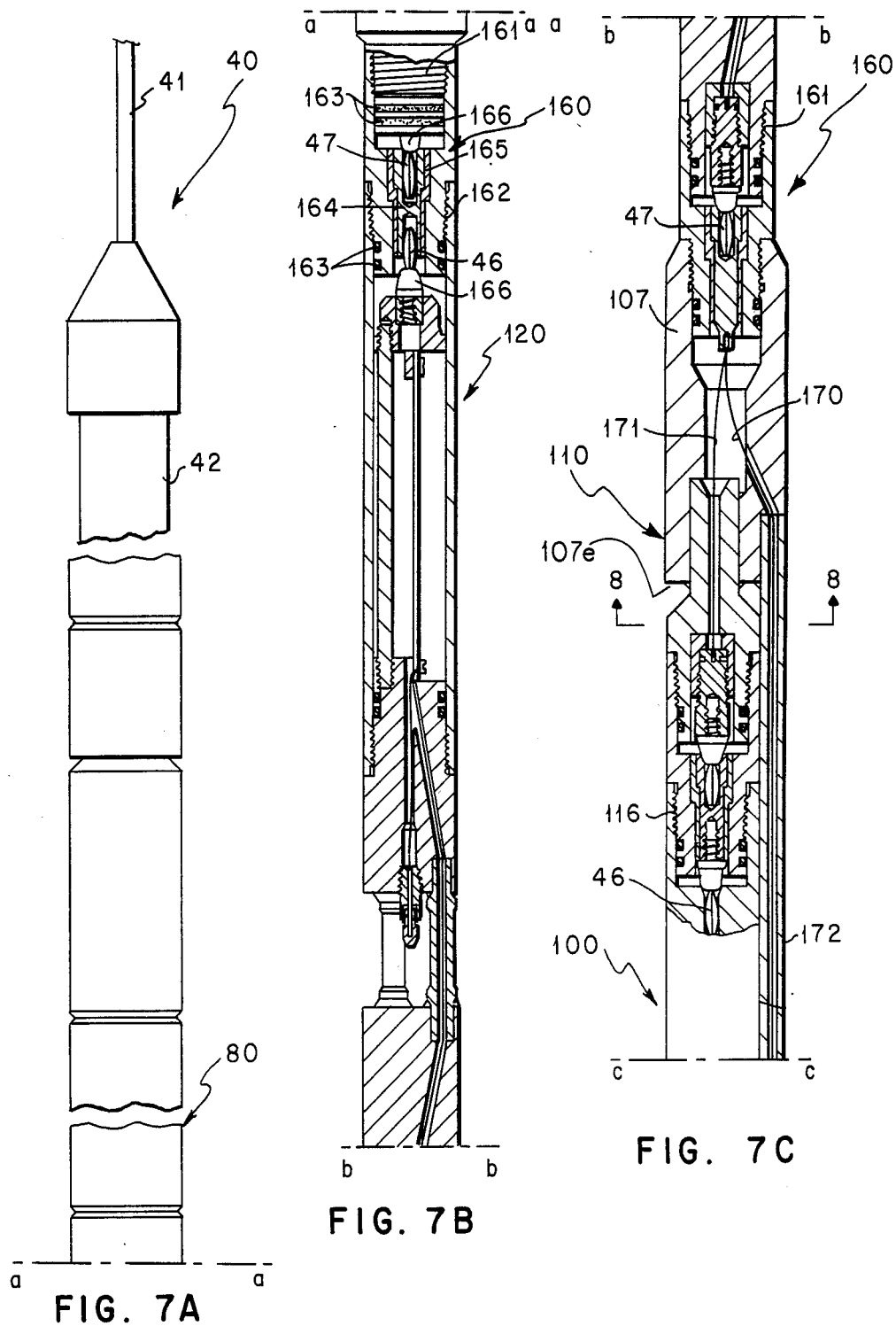
FIGS. 7A-E are drawings, partially in section and partially in elevation with portions broken away, showing the mechanical details of the downhole tool in FIG. 2.
Figure 7D:
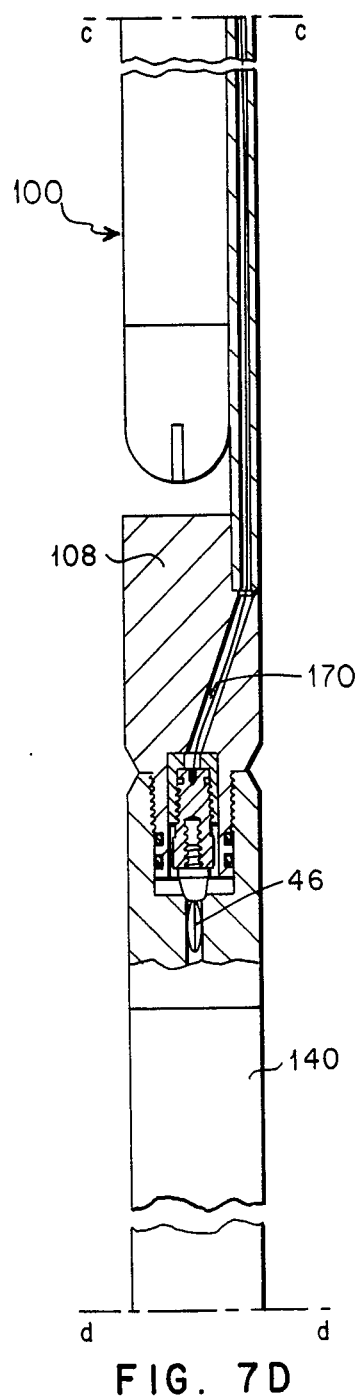
Figure 7E:
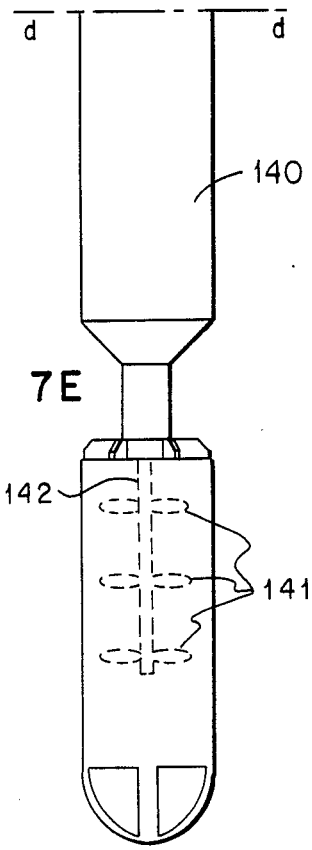
Figure 8:
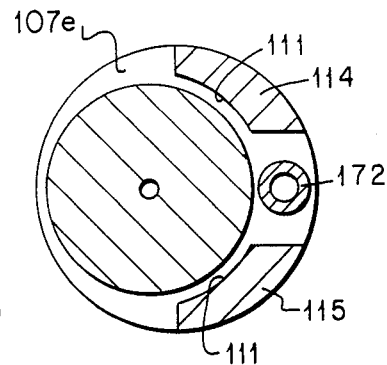
FIG. 8 is an enlarged sectional drawing taken along line 8—8 of FIG. 7C.

The mechanical configuration of flow meter 140 is shown in FIG. 7D. The electrical schematic for flow meter 140 is shown in FIG. 4.

A frequently conducted test is to lower tool 40 to a position immediately above the top of perforations (not shown) through tubing 38 and/or casing 32 communicating with the fluid producing formation. This position is verified by counting collars as tool 40 is lowered. The well is then allowed to produce at a desired flowrate. For this test, flow meter 140 is not required to determine the absolute value of flow such as 200 barrels per hour. But rather, the signal from flow meter 140 is designated as 100% flow. Tool 40 is then slowly lowered past the perforations to record the percentage change in flow rate. This test allows detection of damaged or plugged perforations. A major advantage of the present invention is that pressure, temperature and collar location can be simultaneously measured while recording the flow rate. Previously, separate tools have been installed and removed by separate wireline trips to obtain this same information which is very expensive and time consuming. However, simultaneous recording of these different parameters was not possible. Also, it is very expensive and sometimes impossible to duplicate the same well conditions for each test by each individual sensor.

Fluid flow adjacent to flow meter or sensor 140 impinges upon propellers 141 causing rotation of shaft 142 attached thereto. Electrical contacts 143, 144, and 145 surround shaft 142. Magnetics (not shown) are carried on shaft 142 and cause electrical contacts or switches 143, 144, and 145 to close as shaft 142 rotates the magnets past each switch. The speed of rotation of shaft 142 is proportional to the velocity of the fluid flowing past propellers 141. The speed of rotation is determined by counting the number of closures of switches 143, 144, and 145 during a selected time interval. The direction of fluid flow past tool 40 can also be determined by recording the sequence in which switches 143, 144, and 145 close.

The basic design theory for flow sensor 140 and its associated signal processing circuit within signal processor 60 is that a constant frequency signal of 1800 hertz represents no-flow (no rotation of shaft 142). A shift in frequency to 1600 hertz represents flow in one direction. A shift in frequency to 2000 hertz represents flow in the opposite direction. Each frequency shift is for a relatively short duration which produces a spike or pulse representing rotation of shaft 142. Thus, the information contained within the signal from flow sensor 140 is determined by counting per unit time the frequency shifts above or below a base or center frequency and by determining the value of the frequency shift. Pulses per unit time are proportional to flow rate. The value of the frequency shift indicates the direction of fluid flow.

The electrical circuit shown in FIG. 4 is contained on two individual circuit boards 150 and 151 as shown by dotted lines. The circuit boards are electrically attached to each other by contacts 152, 153, 154, and 155. The electrical network shown on circuit board 151 is commercially available to determine both fluid flow rate and the direction of fluid flow by a flow meter which closes switches 143, 144, and 145. The electrical circuit shown on circuit board 150 is required to allow flow sensor 140 to function as part of downhole tool 40. Circuit board 150 includes terminals 46 and 47, bypass line 48, frequency adjusting network 131, a voltage regulating network partially defined by line 122 and resistor 125 and diode 90, and DC voltage to frequency converter 146. These components function in the same manner as discussed for temperature sensor 120 and collar locator 80.

DC voltage is supplied to switches 143, 144, and 145 via line 170, contact 155, and line 171. The DC voltage is the amount available after DC current flows through resistor 125. Each switch 143, 144, and 145 is connected in parallel with line 171 via a corresponding resistor 173, 174, and 175. One side of capacitor 172 is electrically connected to the line between switch 143 and resistor 173. The other side of capacitor 172 is connected to ground. Identical capacitors 172 are connected in the same manner between switch 144 and its resistor 174 and switch 145 and its resistor 175. When each switch 143, 144, or 145 is closed, the corresponding resistor 173, 174, or 175 is connected to ground. When each switch 143, 144, or 145 is open, no current flow occurs through the corresponding resistor 173, 174, or 175, and the associated capacitor 172 is charged to a relatively high voltage. When each switch 143, 144, or 145 is closed, current flow occurs through the corresponding resistor 173, 174, or 175, and the associated capacitor 172 is discharged to a relatively low or zero voltage.

Inverters 183, 184, and 185 are directly connected to one corresponding switch 143, 144, or 145. Inverters are used to smooth out or eliminate chatter caused by rapid opening and closing of its associated switch during conditions of high fluid flow past propellers 141. Also, inverters are used to produce a very low or zero signal when its associated switch is open. When there is no fluid flow around flow meter 140, each switch 143, 144, and 145 remains open. This causes each capacitor 172 to be charged to a high value providing a positive or high input to each inverter 183, 184, and 185. Thus, the output from each inverter 183, 184, and 185 is a low value or zero during no-fluid flow conditions. A device CD40106BF is satisfactory for use as inverters 183, 184, and 185.

The output from each inverter 183, 184, and 185 is directed to NOR gate 186. NOR gate 186 collects switch closures. The output from NOR gate 186 is normally high. During no-flow conditions, the output from each inverter 183, 184, and 185 is zero and does not change the output from NOR gate 186. When any switch 143, 144, or 145 is closed, its corresponding inverter sends a high or positive signal which trips NOR gate 186 producing zero or low output until the switch is reopened. During one complete revolution of shaft 142, each switch 143, 144, and 145 opens and closes once. This switch action causes three pulses by NOR gate 186 from its normally high output to zero or low output. Therefore, the rotation rate of shaft 142 within flow sensor 140 can be determined by counting the number of zero pulses per unit time on line 187 and dividing by three. Shaft rotation can be converted to fluid flow rate by multiplying by an appropriate conversion factor.

In order to obtain the direction of fluid flow, a logic circuit including flip-flops 176 and 177 is contained on circuit board 51. In addition to NOR gate 186, the output from inverters 183 and 184 is directed to flip-flop 176. A device CD4013BF is satisfactory for use as flip-flops 176 and 177. Flip-flop 176 is selected to produce high or positive output when switch 143 closes before switch 144. If switch 144 closes first, the output from flip-flop 176 is zero. The input to flip-flop 177 is the output of flip-flop 176 and inverter 185 (switch 145). If a positive or high signal is received from flip-flop 176 before switch 145 closes, a positive or plus signal is produced on line 188 and a zero signal placed on line 189. If switch 145 closes before a positive signal is received from flip-flop 176, a positive signal is placed on line 189 and a zero signal on line 188. The result of this logic circuit is that switch closure in the order of 143, 144, and 145 causes line 188 to have a positive signal and line 189 to have a zero or negative signal. Switch closure in the order of 145, 144, and 143 cause line 189 to have a positive signal and line 188 to have a zero signal.

The output from NOR gate 186, which is proportional to fluid flow rate, is directed in parallel to both NOR gates 190 and 191. The signal on line 188 is directed only to NOR gate 190. The signal on line 189 is directed only to NOR gate 191. Device CD4025BF is satisfactory for use as NOR gates 186, 190, and 191. The result of this configuration is that only NOR gate 190 will be triggered by switch closure in the order 143, 144, and 145. NOR gate 191 will be triggered by switch closure in the order 145, 144, and 143. The rate of triggering either NOR gate 190 or 191 will be the same as the rate of triggering NOR gate 186. Thus, line 192 carries voltage pulses proportional to the rate of fluid flow, and line 193 has a constant voltage when switch closure is in the order 143, 144, and 145. When the sequence of switch closure is reversed, line 193 carries voltage pulses proportional to the fluid flow rate, and line 192 has a constant voltage. During no-flow conditions, NOR gate 186 is not triggered. This results in no triggering of NOR gates 190 and 191 and a constant voltage on both lines 192 and 193.

The output from NOR gate 190 is directed via line 192 and contact 154 to bilateral switch or relay 196. The output from NOR gate 191 is directed via line 193 and contact 153 to bilateral switch or relay 195. Relays 195 and 196 determine which resistors 197, 198, and 199 are connected as an input to converter 146. A constant voltage input causes each relay to open. Therefore, during no-flow conditions, both relays 195 and 196 are open. The voltage input to converter 146 is measured by the voltage drop across resistor 199. This value of voltage is selected to produce a frequency output of 1800 hertz from converter 146. When the direction of fluid flow causes voltage pulses to be present on line 193, relay 195 is intermittently closed causing resistor 198 to be intermittently connected in parallel with resistor 199. This results in pulsed decreases in the voltage input to converter 146. The value of the voltage decrease is selected to produce a pulsed frequency output of 1600 hertz from converter 146.

Closure of relay 196 causes resistor 198 to be connected in parallel with resistor 197. This circuit results in a higher voltage drop across resistor 199. This higher voltage is selected to produce a frequency output of 2000 hertz from converter 146.

The combined effect of the electrical circuits on circuit boards 150 and 151 at terminal 46 is frequency pulses of 1600 hertz for flow in one direction, frequency pulses of 2000 hertz for flow in the other direction, and a steady 1800 hertz signal for no-flow. The number of pulses in each situation is proportional to fluid flow rate.

Signal Processing Circuit for Information from Flow Sensor

As previously discussed, flow sensor 140 produces a steady signal of 1800 hertz during no-fluid flow conditions at downhole tool 40. Pulses, proportional to flow rate and having a frequency of 1600 hertz, are produced by fluid flow in one direction at flow sensor 140. Pulses, proportional to flow rate and having a frequency of 1800 hertz, are produced by fluid flow in the opposite direction at flow sensor 140. The flow signal is transmitted from terminal 46 to terminal 74 by electric line 41. Filter 140f is designed to allow frequency signals within the range of 1500 hertz to 2100 hertz to enter the processing circuit for signals from flow sensor 140. Filter 140f functions in the same manner as previously described for filter 80f. The AC output from filter 140f is directed to operational amplifier 210. As previously discussed, amplifier 210 contains both an amplifier to increase the absolute value of the AC signal and a comparator to convert the sine wave type signal into essentially a square wave having the same frequency as the signal leaving filter 140f.

The flow signal is next directed to frequency to DC voltage converter 211 which produces a DC voltage output corresponding to the frequency input. A frequency input of 1600 hertz produces a DC output on line 212 of 7.0 volts DC. A frequency input of 1800 hertz produces 7.5 volts DC, and 2000 hertz produces 8.0 volts DC. Thus, frequency pulses from sensor 140 produce DC voltage pulses out of converter 211 as measured on line 212. A unique feature of the flow signal processing circuit is line 240 which directs the AC input frequency signal to contact 241. This allows instruments such as an oscilloscope to directly monitor the performance of flow sensor 140 and the signal processing circuit through converter 211.

The DC voltage pulses on line 212 are directed in parallel to comparators 215 and 216. For purposes of explanation, comparator 215 will be assumed to have a normally high or positive output and comparator 216 a normally low or zero output when the signal on line 212 is 7.5 volts DC. This arrangement could be easily modified by those skilled in the art depending upon the logic circuit which is used to evaluate the flow information. A device LM339 is satisfactory for use as comparators 215 and 216. When the voltage on line 212 is 8.0 volts DC, comparator 215 shifts to a low or zero output. Comparator 216 is not affected by voltage higher than 7.5 volts DC. When the voltage on line 212 is 7.0 volts DC, comparator 216 shifts to a high output. Comparator 215 is not affected by voltages below 7.5 volts DC. Thus, a signal of 2000 hertz from sensor 140 affects only comparator 215, and a signal of 1600 hertz from sensor 140 affects only comparator 216. In other words, flow in one direction causes comparator 215 to pulse at a rate proportional to the fluid flow rate at sensor 140, and flow in the opposite direction causes comparator 216 to pulse proportional to flow rate.

The DC signal from comparator 215 is directed to inverter 217. The DC signal from comparator 216 is directed to inverter 218. Inverters are used to provide a DC pulse of uniform width corresponding to the pulse rate of its associated comparator. The signal from inverter 218 is directed to inverter 219 to provide a signal with pulses having amplitudes in the same direction as pulses from inverter 217. The signal from both inverters 217 and 219 is directed to OR gate 220 which merely sums the pulses to produce a digital flow rate signal at contact 221. The digital output at contact 221 is not affected by the direction of fluid flow.

The output from each inverter 217 and 218 is directed via appropriate lines and resistors 249 and 250 respectively to provide a combined input to amplifier 222. When the direction of fluid flow causes comparator 215 to be triggered, positive pulses of uniform width are present on line 248 as an input to amplifier 222. When the direction of fluid flow causes comparator 216 to be triggered, negative pulses of uniform width are present on line 218 as an input to amplifier 222.

During no-flow conditions, the output from comparators 215 and 216 is stable with no pulses. This results in no pulses being present or a zero voltage input to amplifier 222 and a zero output reading at contact 223. As either comparator 215 or 216 is pulsed, an analog output at contact 223 is produced by amplifier 222 which is proportional to the input pulse rate. The direction of the analog signal (positive or negative) at contact 223 corresponds to the direction of fluid flow at sensor 140.

Light diodes 229 and 230 provide an alternative means for indicating the direction of fluid flow. The signal from inverter 217 is directed via OR gate 227 to energize diode 229 when fluid flow is in one direction. The signal from inverter 219 is directed via OR gate 228 to energize diode 230 when fluid flow is in the other direction. Thus signal processor 60 provides a visual indication of the direction of fluid flow in addition to an analog signal. Also, light diodes 229 and 230 provide a visual indication that sensor 140, line 41, and associated signal processing circuits are functioning properly.

Pressure Sensor

The signal from pressure sensor 100 is transmitted to terminal 74 via wireline 41. Filter 100f is tuned to accept only signals within the frequency range assigned to sensor 100. Functionally, filter 100f is equivalent to filter 80f but has different values of inductance and capacitance. Operational amplifier 101 and frequency to voltage converter 102 process the pressure signal after it leaves filter 100f in the same manner as amplifier 56 and converter 57 in the temperature signal processing circuit. Frequency converter 102 produces an analog pressure signal which is directed to terminal 106 by line 104. A digital pressure signal is directed to terminal 105 by line 103 and to terminal 106 by line 104 via frequency multiplier 300. Electrical devices 4017 and 4024 are satisfactory for use as multiplier 300.

Strip chart 71 can be electrically connected to terminal 106 and computer 72 to terminal 105. Thus, the present invention allows for simultaneous recording and display of pressure and temperature at the well surface.

Various pressure sensors are commercially available for use as pressure sensor 100 within tool 40. An example of one such pressure sensor is shown in U.S. Pat. No. 3,561,832 invented by H. E. Karrer et al. U.S. Pat. No. 3,561,832 is incorporated by reference for all purposes within this application.

Mechanical Configuration

The mechanical details of tool 40 are shown in FIGS. 7A–C and FIG. 8. Electric line 41 is preferably attached to tool 40 by conventional rope socket 42. As previously explained, collar locator 80 is preferably the first sensor attached to electric line 41.

Adapter subassembly 160 is used to mechanically and electrically connect collar locator sensor 80 and temperature sensor 120. With only minor modifications, adapter subassembly 160 can be used to attach any type of sensor to well tool 40. Subassembly 160 is generally cylindrical with internal threads 161 on one end and external threads 162 on the other end. Threads 161 and 162 are used to make the mechanical connection between the sensors of tool 40. Receptacle 164, disposed within subassembly 160, is manufactured from electrically conductive material such as copper. Electrical insulating material 165 surrounds receptacle 164 and prevents electrical current flow between receptacle 164 and the other portions of subassembly 160. Electrical connectors 166 (banana plugs) can be inserted into receptacle 164. The tip of each connector 166 functions electrically as either terminal 46 or 47. Elastomeric seals 163 are provided to block fluid communication between the exterior of tool 40 and the electrical components carried within each sensor.

For the specific tool 40 shown in FIGS. 7A–D, pressure sensor 100 does not have a terminal equivalent to terminal 47 of the other three sensors. Therefore, two wires 170 and 171 are electrically connected to terminal 47 of temperature sensor 120. Wire 171 is connected to terminal 46 of pressure sensor 100 to supply power thereto and transmit the pressure signal therefrom. Wire 170 extends through hollow tube 172 which mechanically and electrically bypasses pressure sensor 100. Wire 170 supplies the electrical power to and transmits the signal from terminal 46 of flow sensor 140.

Pressure sensor 100 is attached to carrier assembly 110 by threads 116. Assembly 110 includes subassemblies 107 and 108 which are mechanically connected by bypass tube 172 and protective rails 114 and 115. Rails 114 and 115 are segments of a cylinder having the same length as bypass tube 172 and an outside diameter compatible with tool 40. An inside diameter 111 is machined on each rail to allow sensor 100 to be carried with assembly 110. The final result is a downhole tool having a relatively uniform outside diameter with sufficient structural integrity to protect delicate electrical components.

The previously described tool 40 and recording means 50 can be readily adapted for use in other electronic systems. The previous description is illustrative of only one embodiment of the present invention. Changes and modifications will be readily apparent to those skilled in the art and may be made without departing from the scope of the invention which is defined in the claims.

What is claimed is:

1. A system for sensing multiple parameters at remote locations, transmitting information concerning each parameter to a central location and recording the information comprising:
   a. a power supply and signal processor at the central location;
   b. a plurality of sensors;
   c. an electric line connecting the power supply and signal processor with the sensors;
   d. each sensor having a frequency modulator to simultaneously impose a signal on the electric line within a discrete frequency range assigned to each sensor whereby the signals from the plurality of sensors form a combined signal;
   e. a plurality of frequency filters within the signal processor and each filter selected to extract from the combined signal on the electric line the signal from one assigned sensor; and
   f. the power supply further comprising a source of direct current electrical energy, a current regulator to control the amount of direct current flowing through the electric line, a plurality of switches within the current regulator which increase the current flow through the electric line by preselected amounts as each switch is closed, and each switch corresponding to one of the sensors.

2. The system, as defined in claim 1, further comprising:
   a. a plurality of operational amplifiers to increase the gain of the signal from each filter; and
   b. frequency converters to process the signal from each operational amplifier to produce an analog and digital output corresponding to the parameter measured by each sensor.

3. The system, as defined in claim 1, wherein the electric line comprises a single conductor from the central location to each sensor.

4. The system, as defined in claim 1, further comprising:
   a. each sensor electrically connected in parallel with respect to the power supply; and
   b. the operating current requirement of each sensor corresponding to the current produced by closing one of the switches within the current regulator.

5. The system, as defined in claim 4, wherein each sensor further comprises:
   a. a DC volage to frequency converter;
   b. a frequency adjusting network to control the output of the converter to within a preselected frequency range assigned to the sensor; and
   c. means for varying the DC voltage input to the converter to correspond with the parameter being measured by the sensor.

6. The method of measuring and transmitting information from a well tool having multiple sensors at a downhole location in a well bore through a single conductor electrical line to the well surface comprising the steps of:
   a. transmitting electrical energy from a power source at the well surface to the well tool via the electrical line;
   b. each sensor converting the electrical energy to a signal within a discrete frequency range assigned to that sensor;
   c. transmitting simultaneously the combined signal as a composite from all of the sensors to the well surface on the electrical line;
   d. filtering the discrete frequency signals from the combined signal on the electrical line at the well surface to produce one discrete signal for each sensor;
   e. processing each discrete signal to obtain a readout of the information transmitted from the respective downhole sensor;
   f. transmitting direct current electrical energy to the downhole tool by the single conductor electrical line; and
   g. varying the total quantity of the direct current by preselected amounts which correspond respectively to the number and type of sensors utilized by the well tool.

7. The method of claim 6 further comprising the steps of:
   a. each sensor modulating the direct current supplied thereto and producing a variable frequency signal within the respective frequency range to each sensor; and
   b. varying the frequency of each signal to correspond to the value of the information being measured by the respective sensor.

8. The method of claim 7 further comprising the steps of:
   a. dividing the combined signal at the well surface into the individual signals from the respective sensors by filtering each respective frequency bands;
   b. directing each individual signal through an operational amplifier after leaving its respective filter; and
   c. sending each individual signal to a frequency converter to produce an output corresponding to the information measured by the respective sensor.

9. The method of claim 8 further comprising the steps of:
   a. producing an analog output of the information measured by each sensor;
   b. recording the analog output on a strip chart recorder;
   c. producing a digital output of information measured by selected sensors; and
   d. directing the digital output to a computer for storing and further processing.

10. The method of claim 9 further comprising the steps of measuring pressure, temperature, fluid flow and collar location by the sensors carried on the well tool.

11. The method of claim 10 further comprising the steps of:
    a. transmitting the signal from the pressure sensor within the frequency range of 8000 hertz to 26,000 hertz;
    b. transmitting the signal from the temperature sensor within the frequency range of 200 hertz to 400 hertz;
    c. transmitting the signal from the fluid flow rate sensor within the frequency range of 1500 hertz to 2100 hertz; and
    d. transmitting the signal from the collar location sensor within the frequency range of 40 hertz to 60 hertz.

12. The method of claim 11 further comprising the steps of determining the direction of fluid flow at the downhole location by:
    a. assigning a frequency within the range of 1500 hertz to 1700 hertz for flow in one direction;
    b. assigning a frequency within the range of 1900 hertz to 2100 hertz for flow in the other direction; and
    c. the flow sensor producing a signal within the respective frequency range corresponding to the direction of fluid flow at the sensor.

13. The method of claim 12 further comprising the steps of:
    a. directing the output from the frequency converter for the flow signal to a summing network;
    b. assigning a positive or negative value to each pulse by the summing network depending upon the frequency of the pulse;
    c. counting the total number of pulses from the flow sensor by the summing network; and
    d. indicating if the pulses are positive or negative.

14. A system for sensing multiple parameters at a downhole location, transmitting information concerning each parameter to the well surface and recording the information comprising:
    a. a power supply and signal processor at the well surface;
    b. a downhole tool having a plurality of sensors;
    c. an electric line connecting the power supply and signal processor with the downhole tool;

d. each sensor having a frequency modulator to impose a signal on the electric line with a discrete frequency band assigned to each sensor;

e. a plurality of frequency filters within the signal processor with each filter selected to extract from the electric line the signal from one corresponding sensor;

f. the power supply having a source of direct current electrical energy with a current regulator to control the amount of direct current flowing through the electric line;

g. a plurality of switches within the current regulator which increase the current flow through the electric line by preselected amounts as each switch is closed; and h. each switch corresponding to one of the sensors, a plurality of which are simultaneously energized.

15. The system, as defined in claim 14, further comprising;

a. a plurality of operational amplifiers to increase the gain of the signal from each filter; and b. frequency converters to process the signal from each operational amplifier to produce an analog and digital output corresponding to the parameter measured by each sensor.

16. The system, as defined in claim 14, wherein the electric line comprises a single conductor from the well surface to the downhole tool.

17. A system, as defined in claim 14, wherein the downhole tool further comprises four sensors for measuring respectively the parameters of pressure, temperature, fluid flow, and collar location.

18. The system, as defined in claim 17, further comprising:

a. the collar location sensor transmitting a signal within the frequency range of 40–60 hertz;

b. the temperature sensor transmitting a signal within the frequency range of 200 hertz to 400 hertz;

c. the fluid flow sensor transmitting a signal within the frequency range of 1500 hertz to 2100 hertz; and d. the pressure sensor transmitting a signal within the frequency range of 8000 hertz to 26,000 hertz.

19. The system, as defined in claim 14, wherein the downhole tool further comprises:

a. each sensor electrically connected in parallel with respect to the power supply; and b. the operating current requirement of each sensor corresponding to the current produced by closing one of the switches within the current regulator.

20. The system, as defined in claim 19, wherein each downhole sensor further comprises:

a. a DC voltage to frequency converter;

b. a frequency regulating network to control the output of the converter to within a frequency range assigned to the sensor; and c. means for varying the DC voltage input to the converter to correspond with the parameter being measured by the sensor.

21. In a well tool for measuring various parameters at a remote location, a flow sensor comprising:

a. a terminal for receiving electrical power supplied to the sensor and for transmitting information from the sensor;

b. a propeller mounted on a shaft which rotates as fluids move therepast;

c. permanent magnets carried by the shaft;

d. magnet detecting means which actuate each time a magnet rotates therepast;

e. a voltage to frequency converter;

f. a voltage regulating network which directs power received from the terminal to the converter;

g. a rotation direction detecting circuit supplying an input to the converter;

h. a frequency regulating network to control the converter output to within assigned frequency bands;

i. a first frequency band for frequency pulses indicating flow in one direction;

j. a second distinct frequency band for frequency pulses indicating flow in the other direction; and k. the number of shifts of frequency per unit time being directly proportional to the fluid flow rate past the propeller.

22. The system, as defined in claim 14, wherein the signal processor includes one or more light diodes to indicate proper functioning of the system.

* * * * *